United States Patent [19]

Krude

[11] Patent Number: 4,705,128

[45] Date of Patent: Nov. 10, 1987

[54] INDEPENDENT WHEEL SUSPENSION SYSTEM HAVING A DIFFERENTIAL PIVOTABLE ABOUT TWO AXES

[75] Inventor: Werner Krude, Grosse Pointe Park, Mich.

[73] Assignee: GKN Automotive Components Inc., Southfield, Mich.

[21] Appl. No.: 586,054

[22] Filed: Mar. 5, 1984

[51] Int. Cl.$^4$ .................................................. B60K 20/00
[52] U.S. Cl. ..................................... 180/73.3; 280/690
[58] Field of Search ................. 180/73.3, 73.4, 73.5; 280/690, 700, 701

[56] References Cited

U.S. PATENT DOCUMENTS

| 2,911,052 | 11/1959 | Olley | 180/73.3 |
| 3,222,083 | 12/1965 | Stotz | 180/73.5 |

FOREIGN PATENT DOCUMENTS

| 563128 | 8/1944 | United Kingdom | 280/700 |
| 1920705 | 4/1969 | Fed. Rep. of Germany | 180/73.5 |

Primary Examiner—Henry A. Bennett
Attorney, Agent, or Firm—Remy J. VanOphem

[57] ABSTRACT

An independent wheel suspension system having a pair of wheel assemblies, a transverse support member rotatably connected between side frame members of the vehicle frame to pivot about a transverse pivot axis, a differential attached to the transverse support member, a prop shaft coupling the differential and the vehicle engine with universal joints, one of the joints being of the constant velocity plunging type, and a trailing arm pivotably connecting each wheel assembly to the transverse support member, the trailing arm having a wheel end coupled to the wheel assembly and a pair of spaced-apart support sections defining a swing axis therebetween pivotably coupled to the transverse support member so that the swing axis is substantially perpendicular to the wheel axis of the wheel assembly and substantially parallel to the prop shaft axis of the prop shaft, whereby relative motion is allowed about the swing axis between the differential and the wheel assembly while also permitting relative motion about the transverse pivot axis between the vehicle frame and both the differential and the wheel assemblies, while also permitting relative movement between each of the foregoing elements and the driving surface about a drive axis established by a drive shaft coupling the wheel assembly to the differential.

13 Claims, 5 Drawing Figures

INDEPENDENT WHEEL SUSPENSION SYSTEM HAVING A DIFFERENTIAL PIVOTABLE ABOUT TWO AXES

BACKGROUND OF THE INVENTION

Cross-Reference to Related Applications

This patent application is related to the following copending applications assigned to the common assignee hereof:

U.S. Ser. No. 586,086, filed Mar. 5, 1984, entitled "Independent Wheel Suspension System Using Thrust Bearing Constant Velocity Universal Drive Joints As Suspension Members", now U.S. Pat. No. 4,611,681;

U.S. Ser. No. 586,012, filed Mar. 5, 1984, entitled "Independent Wheel Suspension System Using Thrust Bearing Constant Velocity Universal Drive Joints, Bending and Torsional Motion Resistance Suspension Members And A Transversely Pivotable Differential", now U.S. Pat. No. 4,671,370;

U.S. Ser. No. 586,056, filed Mar. 5, 1984, entitled "Independent Wheel Suspension System Using Thrust Bearing Constant Velocity Universal Drive Joints As Suspension Members In Combination With A Single Prop Shaft Joint and A Transversely Pivotable Differential", now U.S. Pat No. 4,669,571;

U.S. Ser. No. 586,011, filed Mar. 5, 1984 entitled "Independent Wheel Suspension System Using Thrust Bearing Constant Velocity Universal Drive Joints As Suspension Members To Minimize Wheel Camber", now U.S. Pat. No. 4,632,203;

U.S. Ser. No. 586,022, filed Mar. 5, 1984 entitled "Independent Wheel Suspension System Using Constant Velocity Universal Joints In Combination With A Single Prop Shaft Joint And Mounted Differentials", now U.S. Pat. No. 4,596,299; and U.S. Ser. No. 586098, filed Mar. 5, 1984 entitled "Independent Wheel Suspension Using Thrust Bearing Constant Velocity Universal Drive Joints As Suspension Members In Combination With A Wheel Assembly And Differential Coupled To Pivot About A Transverse Stabilizer", now U.S. Pat. No. 4,600,072.

Field of the Invention

This invention pertains to independent wheel suspension systems and, more particularly, to independent wheel suspension systems wherein movement of the differential is allowed about two axes.

Description of the Prior Art

It is known to mount a vehicle differential so as to permit relative angular movement thereof about one axis, and then only for purposes substantially unrelated to the independent wheel suspension system. For example, U.S. Pat. No. 2,968,357, to Roller, discloses the pivoting of a vehicle differential on transverse trunnion shafts from the side rails of a vehicle frame for the purpose of reducing the anti-squat of the rear end of the vehicle during vehicle acceleration while also isolating road noise. However, the Roller patent also includes an abutment structure for preventing rotation of the differential in one direction relative to the support frame while normally restraining motion in the other direction, except under acceleration in excess of a predetermined acceleration. U.S. Pat. No. 3,625,300 to Barenyi, et al., discloses the suspension of an axle unit of a motor vehicle by a support member permitting pivoting of the wheel pair in relation to the vehicle superstructure about two mutually perpendicular essentially horizontal axes, but without allowing any relative movement about either the axis between the wheels or the axle gear housing.

SUMMARY OF THE INVENTION

The present invention recognizes that new and improved independent wheel suspension concepts are enabled by allowing relative angular movement of the vehicle differential about two axes, one being a transverse pivot axis transverse to the longitudinal axis of the vehicle and the second axis being a differential output axis established substantially parallel to the transverse pivot axis and spaced a predetermined distance therefrom.

In accordance with the present invention, a transverse support member is rotatably connected to the side frames of a vehicle frame to pivot about a transverse pivot axis. A differential is mounted to the transverse member and adapted to pivot therewith about the transverse pivot axis. The differential has a differential output axis along which is coupled a pair of laterally disposed wheel assemblies by a universally coupled drive shaft having an inboard universal joint at the differential and an outboard universal joint at the wheel assembly. A pair of arms respectively couple each wheel assembly and the transverse support member so as to allow relative movement between the wheel assemblies and the vehicle frame about the transverse pivot axis. Each arm has a pair of spaced-apart pivot support sections pivotably mounted to the transverse support member so as to establish a swing axis therebetween which is substantially perpendicular to the wheel axis and passes through the inboard universal joint. With such a coupling connection, relative movement is permitted between the differential and each wheel assembly about the swing axis. The differential is also coupled by a drive shaft to the engine using universal joints between the engine and the prop shaft. Articulation between the engine and the prop shaft is accommodated by relative movement of the differential about either or both the transverse pivot axis and/or the wheel axis. Relative motion about the transverse axis, the swing axis, and the wheel axis is resisted by a motion resistance structure coupling the vehicle frame to either the differential, transverse support member, arms, or wheel assemblies.

It is, therefore, a primary object of the present invention to provide an independent wheel suspension system of the foregoing type, wherein relative movement of the differential is also allowed about a third axis.

It is a further primary object of the present invention to provide an independent wheel suspension system of the foregoing type, wherein the differential is mounted to be pivotable about both a transverse axis and also a swing axis substantially perpendicular thereto passing through the inboard universal joint of the drive shaft coupling the differential to the wheel.

It is a further primary object of the present invention to provide an independent wheel suspension system of the foregoing type, wherein motion about any of the foregoing axes is restrained by a motion resistance structure.

It is a further primary object of the present invention to provide an independent wheel suspension system of the foregoing type, wherein motion resistance structure couples the vehicle frame with at least one of the transverse support members, the differential, the swing arms, and the wheel assembly.

These and other features and objects of the present invention will become more apparent to those skilled in the art from the following detailed description of a preferred embodiment thereof taken in conjunction with the appended claims and drawings.

DETAILED DESCRIPTION OF THE PREFERRED EMBODIMENT

Figure 1:
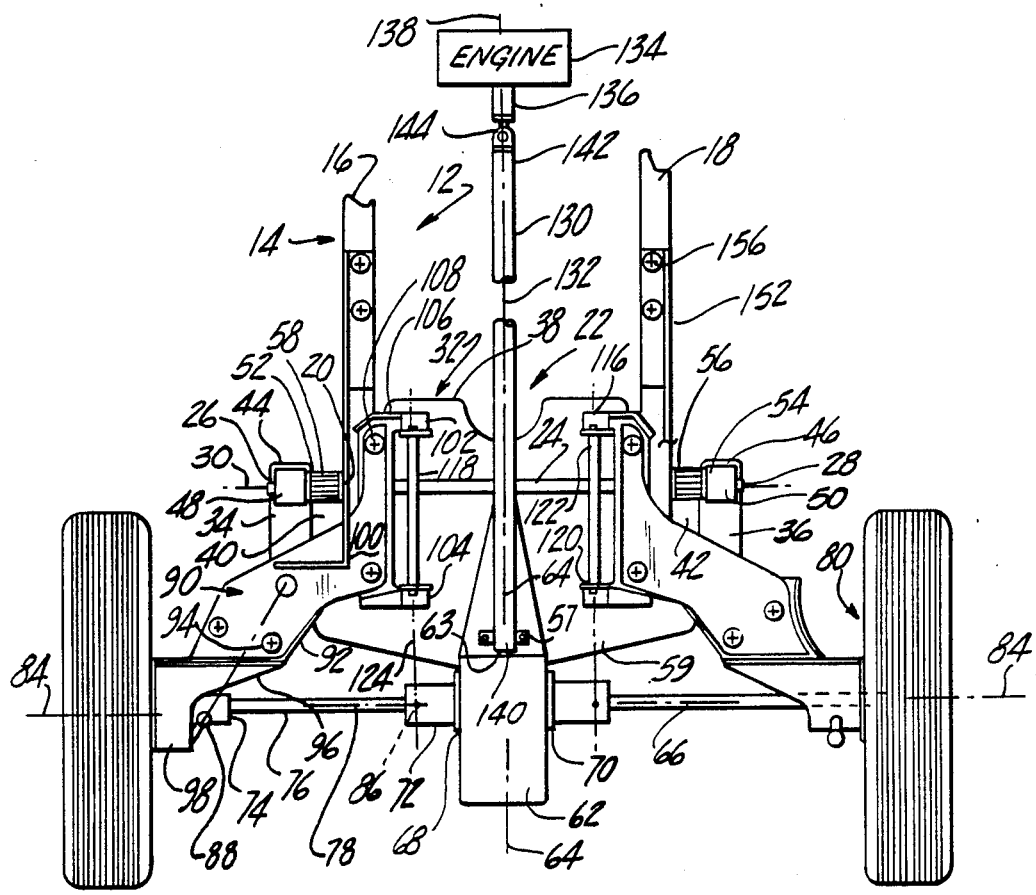
FIG. 1 is a plan view of a portion of a vehicle having an independent wheel suspension system provided in accordance with the present invention.
Figure 2:
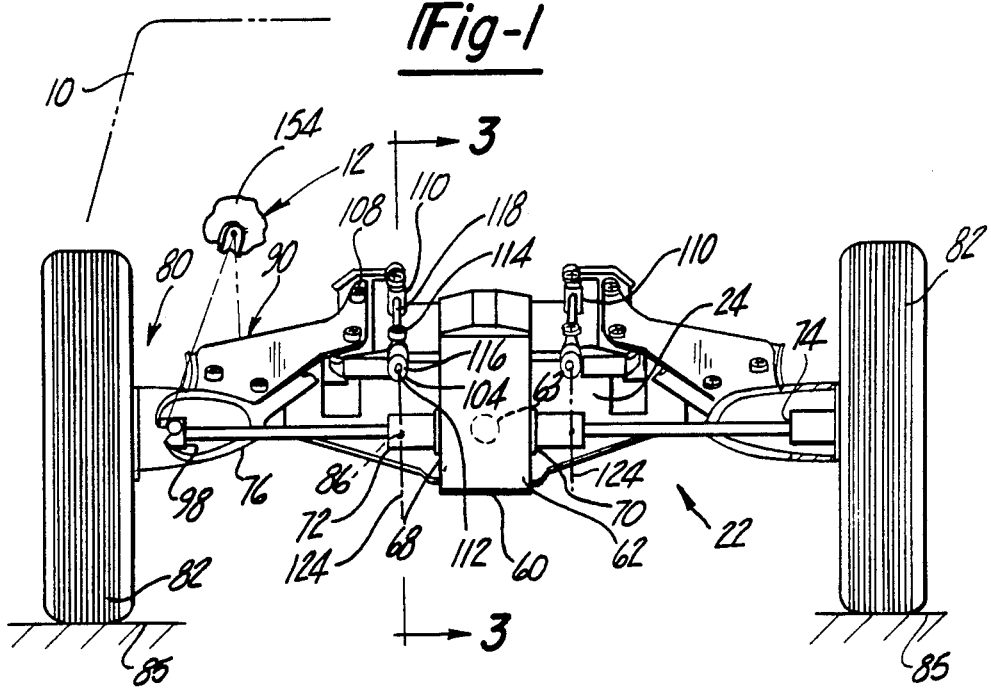
FIG. 2 is a rear view of the independent wheel suspension system of FIG. 1 with the transverse support member tilted rearwardly to show certain elements in perspective.
Figure 3:
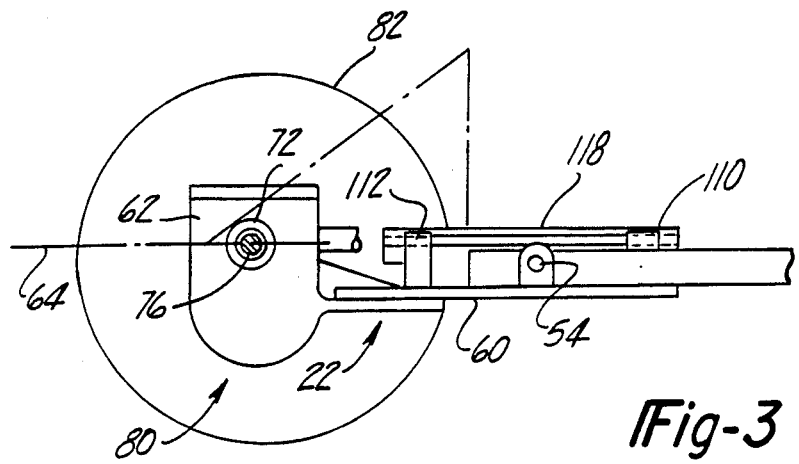
FIG. 3 is a side view of the independent wheel suspension system of FIG. 2 along lines 3—3 thereof.
Figure 4:
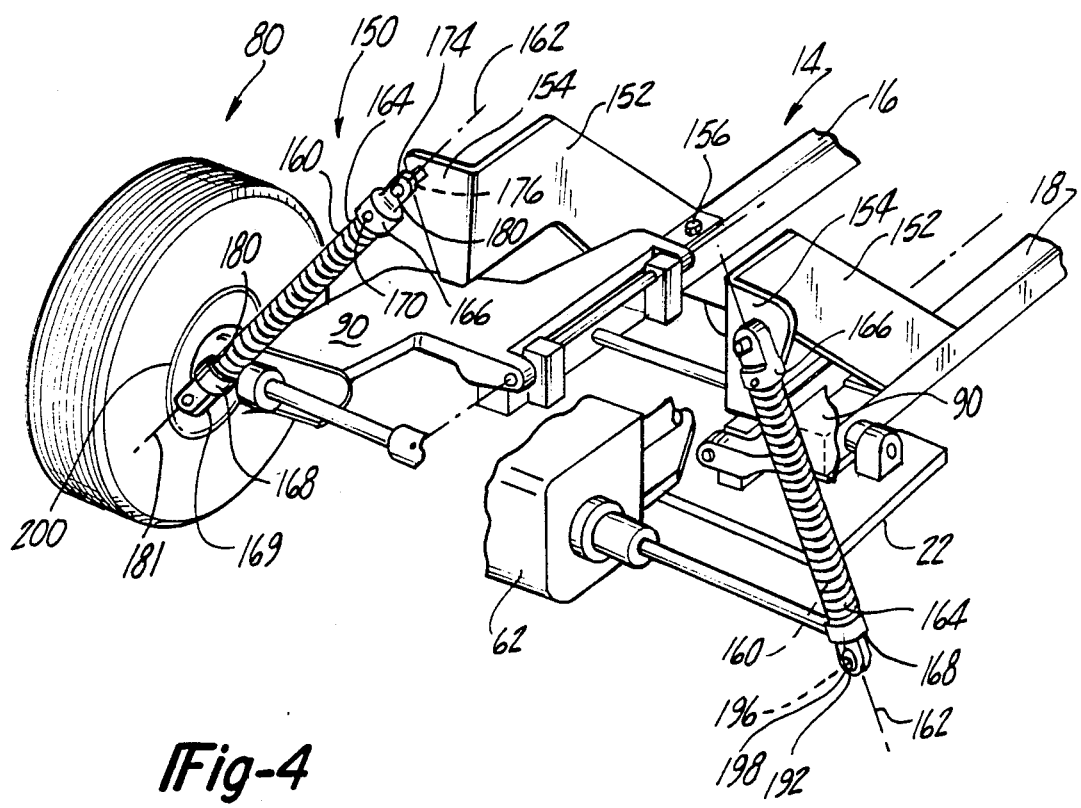
FIG. 4 is an isometric view, partially broken away, of the motion resistance assembly provided in accordance with the present invention.

With reference now to FIGS. 1 and 2, there is respectively shown a plan view and a rear view of a four-wheeled motor vehicle which includes a body 10 mounted to a chassis 12. The chassis 12 is supported in a known manner from a vehicle support means in the form of a vehicle frame that includes a pair of laterally spaced-apart longitudinal side frame members 16 and 18. Chassis as used herein is intended to include a vehicle made of unitary construction wherein some of the chassis components are provided in the body of the vehicle. Pivotably secured between the side frame members 16 and 18, by a pivot coupling means in the form of a journal bore 20 through each side frame member, is a rotatable transverse support member 22 fixed to a transverse support rod 24, the outboard portions 26 and 28 of which are journalled in the journal bores 20 to establish a generally horizontal transverse pivot axis 30.

The transverse support member 22 includes a forward portion 32 having a pair of forwardly extending outboard flange portions 34 and 36 separated from a forwardly extending central portion 38 by a pair of respective frame clearance channels 40 and 42. The frame clearance channels 40 and 42 are of a sufficient length and width to clear the sides and ends of the side frame members 16 and 18 as they pivot about the transverse pivot axis 30. Mounted near the forward portions 44 and 46 of the respective flange portions 34 and 36 are respective resilient annular bushings 48 and 50 fixed coaxially on the respective outboard rod end portions 26 and 28 and fastened thereto by fastening means in the form of a nut and bolt (not shown) to the respective forward portions 44 and 46. The inboard annular sides 52 and 54 of each resilient annular bushing 48 and 50 is adapted to bear on an annular thrust washer 56 and 58 separating the respective side frame members 16 and 18 from the resilient annular bushing 48 and 50.

Fastened, such as by three bolts 57, to a rearward portion 59 of the transverse support member 22, is a mounting surface 60 of a differential 62 having a differential input axis 64 generally parallel with the longitudinal prop shaft axis 132 of the vehicle and a differential output axis 66 substantially perpendicular thereto. Lateral outputs 68 and 70 of the differential 62 are coupled by universally coupled drive shaft means in the form of an inboard universal joint 72 coupled to an outboard universal joint 74 by a drive shaft 76 having a drive axis 78, such drive shaft means coupling each differential output 68 and 70 to a respective wheel assembly 80 having a wheel 82 rotatable about a wheel axis 84 relative to a driving surface 85. The drive axis 78 of the drive shaft 76 intersects the differential output axis 66 of the differential 62 at an inboard joint articulation axis 86 and intersects the wheel axis 84 at an outboard joint articulation axis 88.

The transverse support member 22 and each wheel assembly 80 are coupled by a respective swing arm 90 having a rearwardly extending wheel portion 92 secured such as by bolts 94 to a wheel flange 96 having a hub 98 rotatably secured to the wheel assembly 80 so as to be pivotable about the wheel axis 84.

Each swing arm 90 further includes a support portion 100 having a pair of axially spaced-apart arm coupling means in the form of pivot members 102 and 104 at the end of a bracket 106 secured to the support portion 100 of the swing arm 90 by bolts 108. The pivot members 102 and 104 span a pair of axially spaced-apart pivot posts 110 and 112, secured by bolts 114, so as to be upstanding from the top surface of the transverse support member 22. Secured to an axial bore 116 through each pivot post 110 and 112 is a pivot pin 118 secured fixedly within each axial bore 116 by setscrews. Each pivot pin 118 has a pair of outboard end portions 120 and 122 rotatably journalled in the pivot members 102 and 104. The pivot posts 110 and 112 are positioned on the transverse support member 22 relative to the transverse pivot axis 30 so as to establish a pivot or swing axis 124 at a lateral offset from the differential input axis 64 and the prop shaft axis 132 so as to be positioned relative thereto and passing substantially through the inboard joint articulation axis 86. Moreover, the height of each pivot post 110 and 112 is selected so as to establish the swing axis 124 as also passing through the inboard universal joint 72 at the inboard joint articulation axis 86 thereof. With the swing axis 124 thus established through the inboard universal joint 72, one relative motion is permitted between the wheel assembly 80 and the differential 62 about the swing axis 124 while another relative motion is also permitted about the transverse pivot axis 30 between the vehicle frame 14 and the differential 62. Moreover, with the displacement of the vehicle frame 14 in a vertical direction relative to the driving surface 85, a third relative motion is permitted about the differential output axis 66 between the vehicle frame 14 and each of the members supported thereby including the transverse support member 22, the differential 62, and the swing arms 90.

Figure 5:
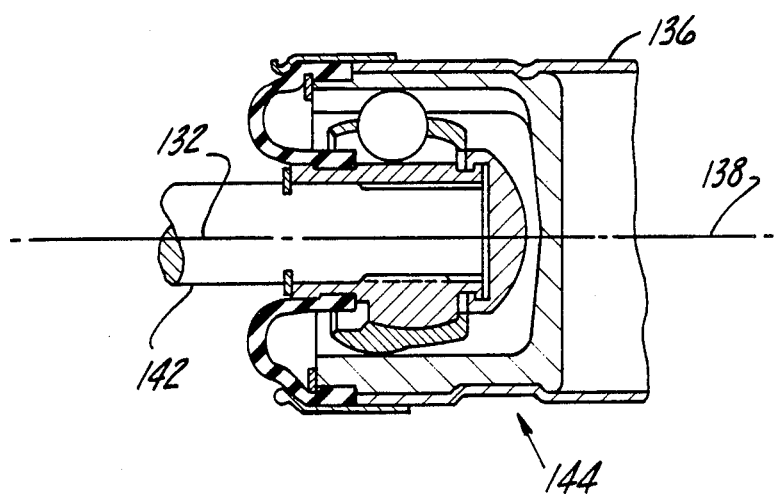
FIG. 5 is a view, partially in cross-section and partially broken away, of an axially plunging type of constant velocity universal joint used to couple the engine and the prop shaft in accordance with the present invention.

The differential input 63 is coupled by a prop shaft 130 having a prop shaft axis 132 to an engine 134 having an engine output 136 adapted to provide a driving torque about an output axis 138. The prop shaft 130 has a differential end 140 fixed to the differential input 63 in the form of a drive pinion (not shown) so that the differential input axis 64 is coaxial with the prop shaft axis 132. The prop shaft 130 also has an engine end 142 coupled by a universal joint 144 to the engine output 136 so as to allow an articulation between the prop shaft axis 132 and the engine output axis 138. The universal joint 144 is of the axially plunging constant velocity type shown in FIG. 5 and described in greater detail in U.S. Pat. No. 3,688,521, to Smith et al., issued to the common assignee hereof on Sept. 5, 1972, the specification of which is hereby incorporated by reference. The articulation between the prop shaft axis 132 and the engine output axis 138 is accommodated at the differential 62 by a commensurate angular relative movement about the transverse pivot axis 30 and the wheel axis 84. It is understood that the prop shaft 130 may have a fixed constant velocity universal joint at one end and a plunging type constant velocity joint at another end.

To restrain each of the aforementioned relative movements, movement restraining means in the form of a shock absorber and coil spring assembly 150 couples the vehicle frame 14 to a suitable resistance point, such as the wheel assembly 80, the swing arms 90, the transverse support member 22, or even the differential 62. More particularly, a rearwardly extending vertical support member 152, having an outwardly extending flange member 154, is suitably secured, such as by bolts 156, to each side frame member 16 and 18. Each shock absorber and coil spring assembly 150 includes a centrally disposed shock absorber 160 acting along an inwardly tilted shock absorber axis 162 and surrounded by a coil spring 164 acting between a top coil spring retaining cap 166 and a bottom coil spring retaining cap 168. The periphery of the top coil spring retaining cap 166 is secured by a setscrew 170 at a predetermined location on the outer cylindrical surface of a female shock absorber member having a mounting hub protruding through an aperture through the top coil spring retaining cap 166. The mounting hub has a bore therethrough to journal on a shock absorber pivot pin 180 mounted, to the outwardly extending flange 154 of the vertical support member 152. The shock absorber pin is resiliently mounted such as by a resilient annular washer interposed between a suitable nut and bolt arrangement (not shown). A male shock absorber member of the shock absorber and coil spring assembly 150 protrudes through an aperture through the bottom coil spring retaining cap 168 and terminates in a yoke member 169 having an aperture 192 therethrough with a partly spherical inner periphery 196 thereat to matingly seat on a ball joint 198 protruding forwardly from a cylindrical outer surface 200 of the wheel flange hub 98.

The foregoing shock absorber and coil spring assembly 150 is so positioned that the pin axis 181 of the shock absorber pin 180 is established to the swing axis 124 at a point transversely intermediate the swing axis 124 and the outboard joint articulation axis 88. The shock absorber mounting hub 174 pivots about the shock absorber pin 180 in a transverse plane substantially through the transverse pivot axis 30. The ball joint 198 protrudes from the flange hub 98 of the wheel assembly 80 also in a direction relative to the swing axis 124 and is positioned transversely so that the partly spherical inner periphery 196 articulates about an axis contained in a plane also containing the outboard joint articulation axis 88. The ball joint 198 is disposed about the wheel axis 84 and spaced from the transverse pivot axis 30 so as to apply an acting torque on the wheel flange 96 cooperating with the vertical support member 152 to restrain relative movement of the vehicle frame 14 in a forward direction about the transverse pivot axis 30 while also restraining movement of the swing arm 90 in a downwardly and outwardly direction about the swing axis 124.

Those skilled in the art will recognize that the vehicle suspension system described herein may also include various combinations of helical springs, leaf springs, shock absorbers and other well known dampening suspension devices.

Although the best mode contemplated by the inventor for carrying out the present invention as of the filing date hereof has been shown and described herein, it will be apparent to those skilled in the art that suitable modifications, variations and equivalents may be made without departing from the scope of the invention, such scope being limited solely by the terms of the following claims.

What is claimed is:

1. An independent wheel suspension system for a vehicle having a chassis, vehicle support means for supporting said chassis for displacement relative to a driving surface, a pair of laterally spaced-apart wheel assemblies, each having a wheel rotatable about a wheel rotation axis, an engine having an engine output adapted to provide a driving torque about an engine output axis, said independent wheel suspension system comprising:

transverse support means rotatably connected to said vehicle support means to pivot about a transverse pivot axis;

a differential mounted to said transverse support means adapted to pivot therewith about said transverse pivot axis, said differential having a differential input adapted to receive said driving torque about a differential input axis and to redirect said driving torque to a differential output about a differential output axis substantially parallel to said transverse pivot axis; and a pair of arm means each coupling one of said pair of wheel assemblies and said transverse support means, each of said pair of arm means having a wheel end coupled to said one wheel assembly and a pair of spaced apart support sections establishing a swing axis therebetween, each said support section being pivotably coupled to said transverse support means so as to establish said swing axis substantially perpendicular to said wheel axis;

whereby a first relative movement is allowed about said swing axis between said differential and each said wheel assembly while a second relative movement is allowed about said transverse pivot axis between said vehicle support means and both said differential and said wheel assemblies.

2. The independent wheel suspension system of claim 1, wherein said spaced-apart support sections establish said swing axis substantially parallel to said differential input axis.

3. The independent wheel suspension system of claim 1 further comprising prop shaft means having a prop shaft axis and coupling said differential input and said engine output, said prop shaft means comprising at least one universal joint means allowing articulation between said prop shaft axis and one axis of said engine output axis and said differential input axis.

4. The independent wheel suspension system of claim 3, wherein said swing axis is established substantially parallel to said prop shaft axis.

5. The independent wheel suspension system of claim 3, wherein said one axis comprises said engine output axis and said articulation is accommodated by an accommodating movement of said differential about at least one of said transverse pivot axis and said wheel axis.

6. The independent wheel suspension system of claim 3, wherein said at least one universal joint means comprises a constant velocity universal joint of the axially plunging type.

7. The independent wheel suspension system of claim 1, and further comprising drive shaft means having a drive axis universally coupling said differential output and said wheel assembly, whereby a third relative movement is allowed about said wheel axis between said driving surface and at least one of said vehicle support means, said transverse support means, and said differential.

8. The independent wheel suspension system of claim 7, wherein said drive shaft means comprises a universal joint along said swing axis.

9. The independent wheel suspension system of claim 1 further comprising movement resistance means coupling said vehicle support means and at least one pair of said pair of arm means and said pair of wheel assemblies, said movement resistance means adapted to resist at least one relative movement of said first and second relative movements.

10. The independent wheel suspension system of claim 9, wherein said movement resistance means are further adapted to resist said third relative movement.

11. An independent wheel suspension system for a wheel assembly of a vehicle having a chassis, and vehicle support means for supporting said chassis for displacement relative to a driving surface comprising:
 transverse support means rotatably supported by said vehicle support means so as to allow an angular movement relative thereto about a first transverse axis;
 power delivery means having an output axis coupled to said wheel assembly; and
 coupling means fixedly coupling said transverse support means and said power delivery means so as to permit rotary movement of said power delivery means about said first transverse axis upon said angular movement of said transverse support means relative to said first transverse axis and about a second axis independent of said first transverse axis.

12. The independent wheel suspension system of claim 11, wherein said second axis is one axis of said differential output axis and said swing axis substantially perpendicular to said differential output axis.

13. An independent wheel suspension system for a vehicle having a power delivery unit for translating torque from an engine through a differential to a vehicle driving wheel in contact with a driving surface, said independent wheel suspension system comprising:
 transverse support means mounted to said vehicle so as to permit rotational movement of said transverse support means relative to said vehicle, said transverse support means having a first axis of rotation;
 a second axis of rotation spaced in a predetermined position relative to said first axis of rotation for cooperation therewith; and
 means for mounting said differential fixedly to said transverse support means and about said second axis of rotation to permit arcuate movement of said differential about said first axis of rotation and rotary movement of said differential about said second axis of rotation when said vehicle is displaced relative to said driving surface.

* * * * *

UNITED STATES PATENT AND TRADEMARK OFFICE
CERTIFICATE OF CORRECTION

PATENT NO. : 4,705,128

DATED : Nov. 10, 1987

INVENTOR(S) : Werner Krude

It is certified that error appears in the above-identified patent and that said Letters Patent is hereby corrected as shown below:

Column 1, line 27, after "1984" insert a comma ---- , ----.

Column 1, line 32, after "1984" insert a comma ---- , ----.

Column 1, line 37, after "586" insert a comma ---- , ----, same line, after "1984" insert a comma ---- , ----.

Column 5, line 35, delete the comma "," after mounted.

Column 5, line 37, after "mounted" insert a comma ---- , ----.

Column 6, line 38, delete "spaced apart" and insert spaced-apart ----.

Column 6, line 54, after "1" insert a comma ---- , ----.

UNITED STATES PATENT AND TRADEMARK OFFICE
CERTIFICATE OF CORRECTION

PATENT NO. : 4,705,128

DATED : Nov. 10, 1987

INVENTOR(S) : Werner Krude

It is certified that error appears in the above-identified patent and that said Letters Patent is hereby corrected as shown below:

Column 6, line 61, delete "said" and insert ---- a ----.

Column 7, line 17, after "1" insert a comma ---- , ----.

Column 7, line 26, delete "said" and insert ---- a ----.

Column 8, line 13, delete "said" and insert ---- a ----.

Signed and Sealed this

Second Day of August, 1988

Attest:

DONALD J. QUIGG

Attesting Officer     Commissioner of Patents and Trademarks